Patented Dec. 12, 1939

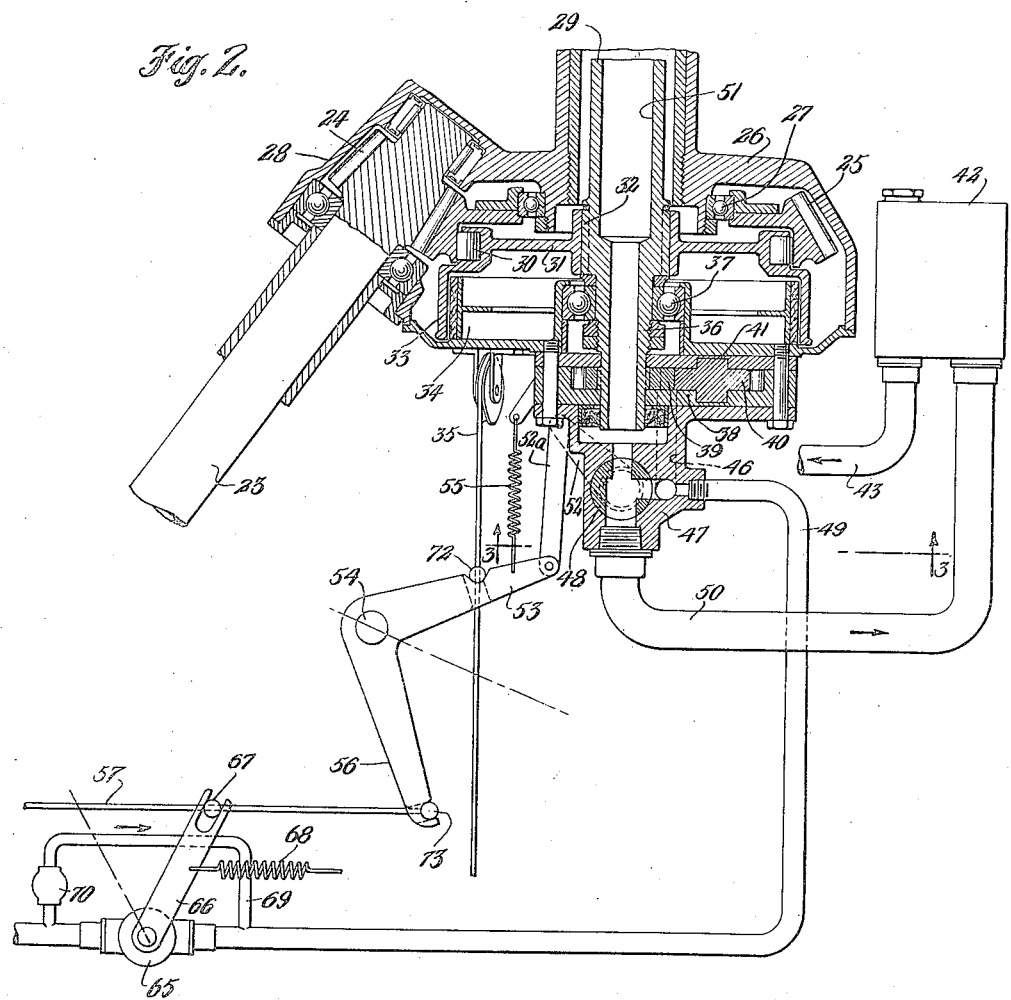

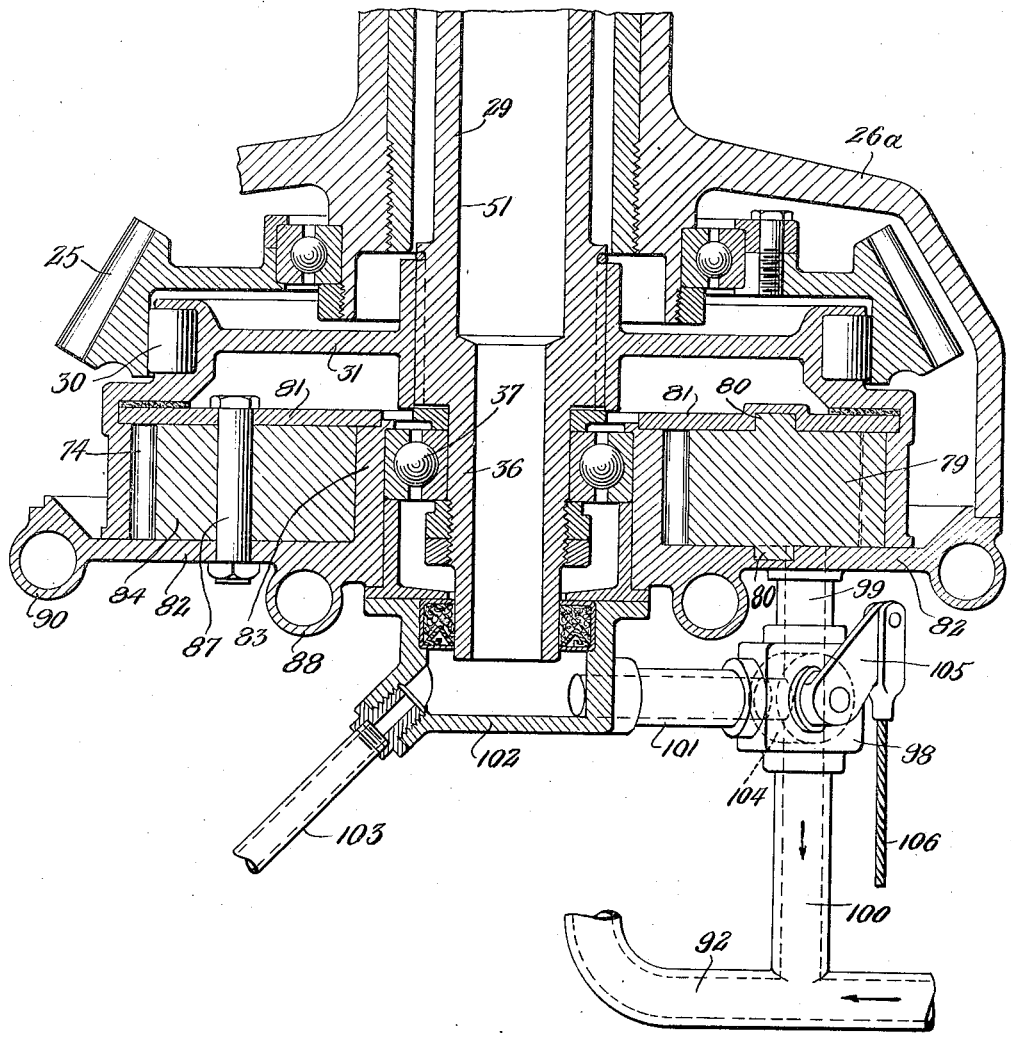

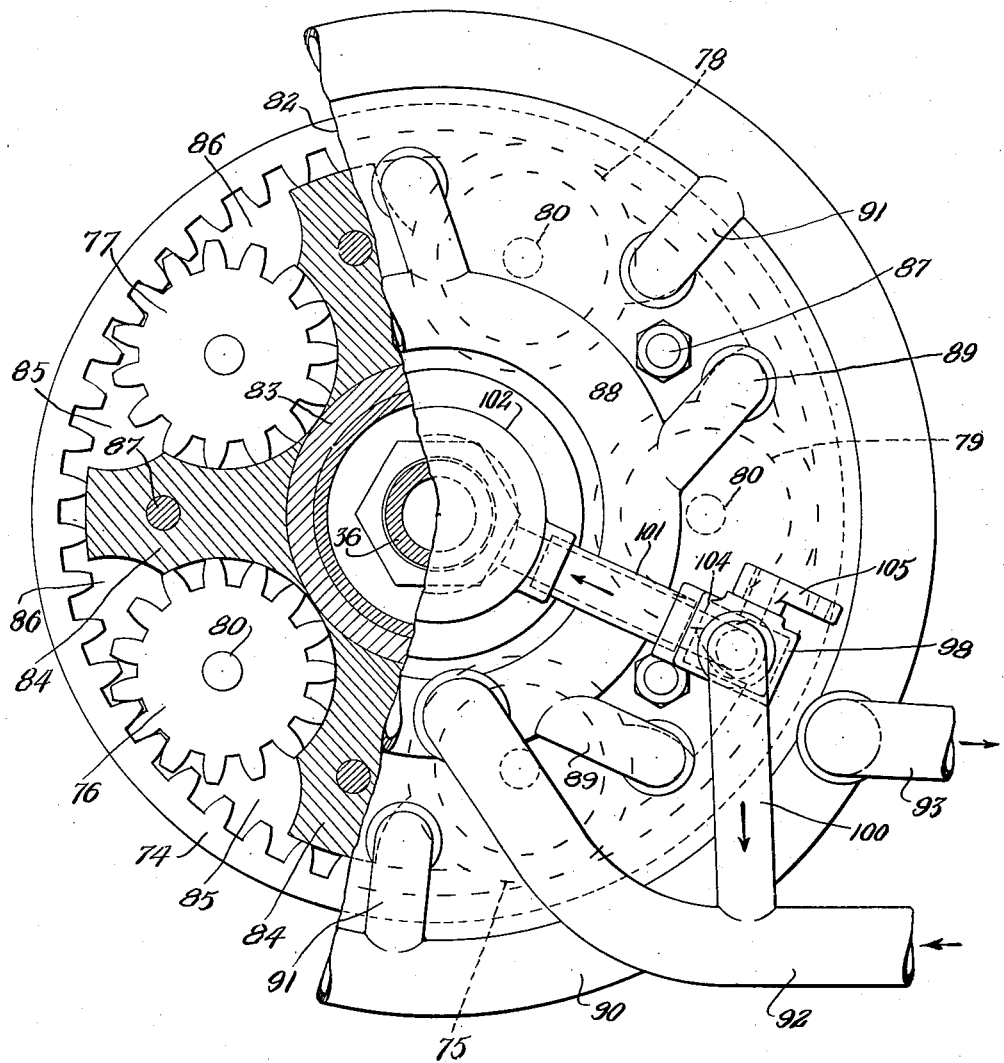

2,183,119

UNITED STATES PATENT OFFICE 2,183,119

ROTATIVE-WINGED AIRCRAFT

Agnew E. Larsen, Jenkintown, Pa., assignor, by mesne assignments, to Autogiro Company of America, a corporation of Delaware Application March 22, 1938, Serial No. 197,368

21 Claims. (Cl. 244—18)

This invention relates to rotative-winged aircraft, and the invention is more particularly concerned with driving means for the sustaining rotor and controlling means therefor and also for other mechanisms on the craft. The invention, moreover, has especial reference to a craft of the type in which a bladed rotor is employed for sustension, control, and even vertical take-off.

In an aircraft of this general type, various maneuvers require or at least make desirable pitch change movement of the blade or blades of the rotor, whereby to vary the lift of the rotor as a whole. Hydraulic pitch control means have been developed for this purpose, for example as shown in copending application of James G. Ray, Serial No. 91,838, filed July 22, 1936, and the present invention is particularly useful in connection with an aircraft in which such hydraulic pitch control means is utilized.

One of the objects of the present invention is to provide a pump for developing hydraulic pressure for actuating the pitch control means, which pump is also utilized for other purposes, so that a single mechanism serves several different functions.

In accordance with another important aspect of the invention, the hydraulic pump is incorporated in the rotor head or hub itself and is driven by the hub, this being of advantage since it locates the source of pressure very close to the point of use of that pressure.

In addition to the above, the provision of a pump driven by the rotor hub results in an important advantage, as follows. Since a rotor drive mechanism is extended upwardly from the body of the craft to the rotor hub for the purpose of driving the rotor, the take-off of a small amount of power at the rotor hub for actuating the pump serves the purpose of providing fluid pressure for actuating the blade pitch control mechanism without the necessity of carrying a separate drive up from the body to the hub to actuate the pump, or of employing extended fluid pressure lines from a pump located in the body.

The invention further makes provision for decrease of rotor blade pitch when the rotor is being slowed down by a brake mechanism, as, for instance, just after making a landing. In association with this feature, the invention provides for utilization of the drag of a pump on the rotor hub either to assist a separate rotor brake mechanism or to perform the entire braking function.

Still further, the invention makes provision for utilization of the fluid pressure developed by the pump for controlling or actuating other devices on the craft such, for example, as wheel brakes.

The invention also has in view the provision of control systems for various of the elements already mentioned and also for the disconnectible clutch or the like in the rotor drive mechanism, said control systems being interlocked at least as to some functions, so as to provide the desired operation and utilization of the fluid pressure pump under different conditions, such as take-off and landing.

How the foregoing objects and advantages are attained will appear more fully from an examination of the following description, taken together with the accompanying drawings, in which—

Figure 2 is an enlarged vertical sectional view of certain parts shown in Figure 1, especially the lower portion of the rotor head and some of the closely associated elements of the control system;

Figure 3 is a bottom view of certain parts of the rotor head shown in Figure 2, taken as indicated by the line 3—3 on Figure 2;

Figure 4 is a view of a control valve incorporated in the system, illustrating a different position from that appearing in Figure 2;

Figure 6 is an enlarged vertical sectional view of the lower portion of the hub of the arrangement of Figure 5; and Figure 7 is a bottom view, partly in elevation and partly in section, of the rotor hub of Figures 5 and 6.

Figure 1:
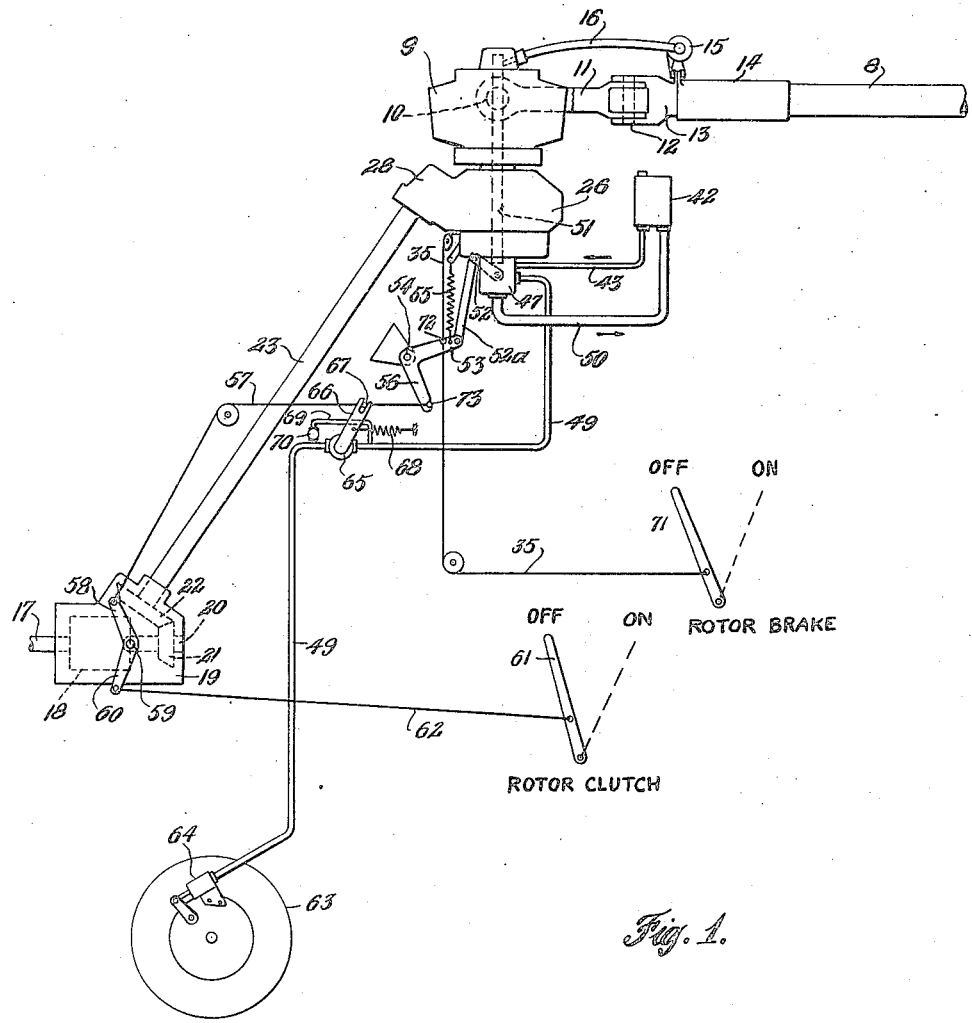
Figure 1 is a somewhat diagrammatic side elevational view of a rotor hub, rotor drive mechanism, a landing wheel, and a control system for these various elements constructed and arranged in accordance with the invention.

In Figure 1, a rotor blade appears at 8, this blade being articulated to the rotative hub part 9 by means of a flapping hinge 10, extension link 11, and drag hinge 12, which latter cooperates with the forked blade root member 13 projecting into a sleeve 14, the axis of these two parts being coincident with the longitudinal blade axis and providing for pitch change movement of the blade with respect to the member 13 substantially about said longitudinal blade axis. Control of the pitch setting of the blade is accomplished by means of a fluid pressure piston and cylinder device 15 acting in a sense to move the blade from high pitch to low pitch position, the return movement from low pitch to high pitch position being preferably accomplished under the influence of centrifugal force as by employing a steep thread on the blade spar cooperating with a complementary thread in the sleeve 14. Fluid is supplied to the device 15 through a flexible fluid supply connection 16 extended therefrom inwardly to the rotor hub, this general type of incidence control mechanism being more fully described in the aforesaid copending application of James G. Ray, Serial No. 91,838. While only one blade has been illustrated in Figure 1, it will be understood that any suitable number may be employed in the rotor.

It is here noted that the rotor hub may, if desired, be mounted for tilting movements in all directions to provide for shift of the lift line of the rotor and thus for control of the craft in flight. Such tiltable control may be patterned after the type of mechanism fully described in copending application of Juan de la Cierva, Serial No. 645,985, filed December 6, 1932, but need not be considered in detail herein since it forms no part of the present invention per se.

The rotor may be driven by means of an engine (for example a forward propulsion engine) mounted in the body of the craft, and for this purpose a drive shaft 17 is connected with the engine (not shown) and also with a clutch mechanism diagrammatically indicated at 18 mounted within the clutch and gear housing 19. A shaft 20 extends from the torque delivery side of the clutch 18 and carries a bevel gear 21 meshing with another gear 22 mounted on the lower end of the upwardly extending drive shaft 23.

At its upper end the shaft 23 (see Figure 2) carries a bevel pinion 24 meshing with gear 25 which is mounted for rotation in the non-rotative housing 26 by means of a bearing 27. The housing 26 also has an extension at one side, as shown at 28, to enclose and journal the driving pinion 24. The drive is delivered from gear 25 to the rotative hub shaft 29 through an overrunning clutch 30 arranged peripherally around the disk 31 which is keyed as at 32 to the shaft 29. The disk 31 is also employed to carry a brake drum 33 with which the brake shoes 34 cooperate. A brake control cable is shown at 35. The rotative shaft 29 for the rotor hub has a reduced lower extension 36 journaled in the bearing 37 and projecting into a gear pump housing 38. The gear pump comprises two gears, one of which 39 is splined to the shaft extension 36 and the other of which 40 is provided with bosses 41 at opposite sides thereof, forming a rotative axis therefor. A supply of fluid, preferably oil, is carried in the reservoir 42, an inlet connection 43 being extended therefrom to deliver oil to the inlet chamber 44 of the gear pump (see Figure 3). An outlet chamber 45 is located at the opposite side of the pump and is provided with a discharge passage 46 delivering to the valve casing 47. The valve member proper 48 is provided with portage, generally of T-shape. In the valve position shown in Figure 2, the oil delivered through passage 46 may flow into connection 50, and since at this time the connection 49 and the internal passage 51 located within the rotative shaft 29 are both interconnected with passage 46 and pipe 50, the entire system is at low pressure. Connection 50 constitutes a return line to the reservoir 42 which is at low pressure and with the valve positioned as shown in Figure 2, the gear pump merely circulates oil to and from the reservoir 42.

In the position shown in Figure 4, however, the return 50 extending to the reservoir 42 is blocked so that pressure is developed by the pump and delivered through passage 46 to connection 49 and also upwardly to the blade pitch control mechanism. At this time pressure is present to accomplish blade pitch change and also other functions discussed hereinafter.

Movement of the valve may be effected through the actuating arm 52 which is connected by link 52a with one arm 53 of a bell crank pivoted at 54. Return spring 55 acting in tension, assures return of the valve to the position shown in Figure 2. The other arm 56 of the bell crank is coupled by means of cable 57 with arm 58 of a bell crank mounted to rotate with the clutch actuating shaft 59 arranged in the clutch and gear unit 19 of the rotor drive mechanism (see Figure 1). The other arm 60 of this bell crank is connected to the clutch or control lever 61 by cable 62.

Still referring to Figure 1, reference is now made to the landing wheel shown at 63 which is provided with a hydraulically actuated brake mechanism 64. According to the invention, this wheel brake is supplied with actuating fluid from the pump located in the rotor hub, the pipe 49 hereinbefore mentioned being employed for this purpose. While fluid pressure control means for the wheel brake entirely independent of other devices may be employed, the invention preferably provides an interlock of wheel brake operation with other functions, either as a substitute for independent operating means or as a supplement thereto. With this in mind, the pipe 49 is provided with a valve 65 actuable by lever 66 having a fork end in engagement with an abutment 67 carried by the cable connection 57. Actuation of the clutch control lever 61 therefore also causes movement of arm 66 for the wheel brake valve, it being here pointed out that the position shown in full lines in Figures 1 and 2 is that in which the valve 65 is closed. The valve is biased to closed position by tension spring 68. This valve is preferably also equipped with a by-pass 69 having a check valve 70 therein providing for restricted flow from the outlet side of valve 65 to the inlet side thereof, this for a purpose more fully brought out hereinafter.

The rotor brake actuating cable 35 hereinbefore mentioned extends over suitable pulleys for connection with the brake lever 71, and in addition this cable 35 is operatively coupled with the arm 53 of the upper bell crank by means of an abutment 72, this connection being so arranged that actuation of the brake control lever not only applies the brake but also causes the bell crank arm 53 to move downwardly and actuate the fluid pressure control valve. The connection between the cable 35 and arm 53, however, permits free downward movement of arm 53 under the influence of a pull on control cable 57 without moving cable 35.

It may here be noted that the connection between the lower arm 56 of this bell crank and cable 57 preferably includes an abutment 73 through which arm 56 is moved when cable 57 is actuated by the clutch lever 61. The arrangement at this point also provides freedom for movement of arm 56 independently of cable 57, in which event cable 57 would merely project through the aperture in which the abutment 73 seats.

To fully and clearly set out the functional aspects of the above mechanism, it is assumed first that the craft is standing on the ground and that it is desired to effect take-off. For this purpose, after starting of the propulsion engine or other source of power with which drive shaft 17 is coupled, the clutch operating lever 61 is moved from "off" to "on" position. This movement actuates the clutch 18 to deliver torque from shaft 17 upwardly through shaft 23 to the rotor hub to drive the same and also actuate the gear pump. By virtue of the resultant movement of cable 57, at this time the valve 65 is also opened so as to permit supply of actuating fluid to the wheel brakes. Still further, movement of the clutch control lever moves valve 48 to the position shown in Figure 4, in which position return pipe 50 is blocked, causing the gear pump to develop pressure which is delivered upwardly through passage 51 to the pitch control device 15. Delivery of pressure to this device causes the rotor blade pitch to be reduced, preferably to approximately zero pitch setting. While the rotor is preferably capable of autorotational actuation in flight, the drive before taking-off is preferably continued, with the blade pitch at a low value, until the rotor R. P. M. has substantially exceeded the normal autorotational value. The craft will, of course, remain stationary on the ground (as against the thrust of the forward propulsion means) during this rotor driving or starting operation, by virtue of the delivery of fluid from the pump through connection 49 to the wheel brakes.

When a high rate of rotation has been imparted to the rotor, the clutch control lever is moved from "on" to "off" position, and this movement disconnects the clutch 18 and moves the fluid pressure control valve from the position shown in Figure 4 to the position shown in Figure 2, in which the return passage 50 to the reservoir is open, thus substantially eliminating pressure in the entire fluid system, since a practically unrestricted circuit is provided from the inlet to the outlet side of the pump. This reduction in pressure permits the action of centrifugal force to move the rotor blade or blades from a lower to a higher pitch position, and at the higher pitch the kinetic energy stored in the rotor produces a high initial thrust which may even be sufficient to lift the craft substantially vertically from the ground.

Release of the rotor clutch control also effects closure of the wheel brake valve 65 and the pressure in the wheel brake system at the outlet side of valve 65 may now be dissipated by flow through the by-pass 69 and check valve 70.

Upon decrease in rotor R. P. M., as the kinetic energy is expended, the substantially normal autorotational rate is reached and at this time rotation of the rotor is continued under the influence of the relative air-flow in flight.

In making a landing, preferably just after the machine has settled on the ground, the rotor brake control is moved from "off" to "on" position. This applies the brake 34 in order to rapidly slow down the rotor. Simultaneously, application of the rotor brake results in movement of the fluid pressure valve from the position of Figure 2 to the position of Figure 4, with the result that the pressure of the gear pump is again effective to actuate the blade pitch control device so as to reduce the blade pitch. This is of advantage in order to promptly dissipate the lift of the rotor upon landing and thus avoid undesired re-take-off, as in gusty air or under other conditions.

In connection with the application of the brake, it should further be noted that by virtue of closure of the return passage 50, the gear pump also applies a drag to the rotor and this not only performs the function of reducing the blade pitch but also assists in bringing the rotor to a stop.

Figure 5:
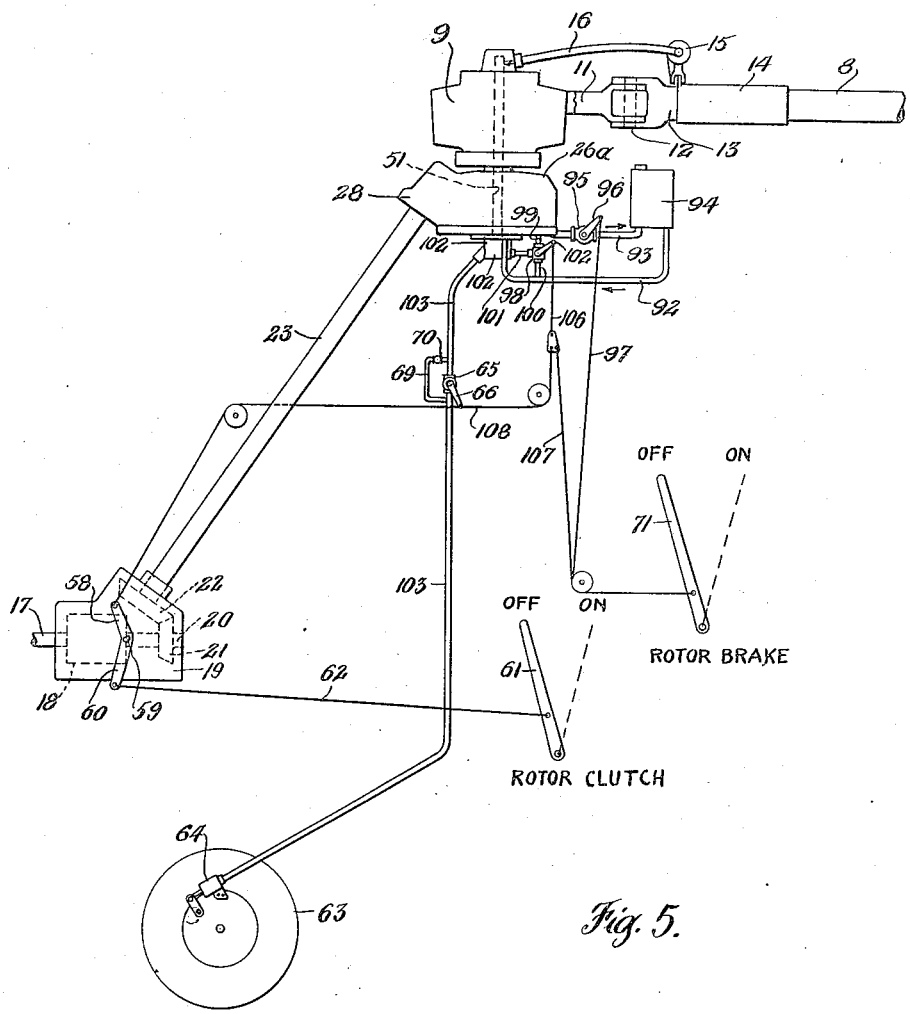
Figure 5 is a view similar to Figure 1 but illustrating a modified arrangement.

In considering the form of the invention illustrated in Figures 5, 6 and 7, it is first noted that various parts of the arrangement are identical with those employed in the arrangement of Figures 1 to 4 and that these are identified in Figures 5, 6 and 7 by the same reference numerals. For example, in Figures 5, 6 and 7 most of the parts of the rotor hub, blade mounting, pitch change mechanism, rotor drive including clutch and gear parts, rotor clutch and rotor brake control levers, and the landing wheel, are all identified by the same numerals as those used in the form illustrated in Figures 1 to 4.

There are, however, some features of difference in the rotor head structure as illustrated particularly in Figures 6 and 7. As here shown, the non-rotative casing 26a not only supports and encloses the gear 25 and overrunning clutch 30, but also serves to support and house a multi-unit fluid pressure pump and brake device which is fully described just below.

In the arrangement of Figures 5, 6 and 7, the disk 31 which carries the roller clutch 30, further carries an internal gear 74, which gear therefore rotates with the rotor. This internal gear meshes with and drives a series of pinions 75, 76, 77, 78 and 79, each journaled by means of bosses 80—80 in upper and lower annular plates 81 and 82. The lower plate 82 constitutes a closure for the casing 26a and has a cylindrical portion 83 at its inner edge in which the lower hub shaft extension 36 is journaled as by the bearing 37.

Between the several gears 75 to 79 there are provided filler blocks 84, each substantially filling the space between two adjacent gears (see for example gears 76 and 77 in Figure 7) except for cut-out portions at the outer end of each member providing inlet and outlet fluid chambers 85 and 86 for the several gear pump units. The filler blocks 84 are secured in position by bolts 87 (see Figure 6), which bolts serve also to rigidly mount the upper closure plate 81 for the pump assembly. The filler blocks further support the upper plate 81, as is clearly seen in Figure 6.

The inlet chambers for all of the gears 75 to 79 are supplied with fluid from the inlet ring 88, there being a generally radial branch 89 extended outwardly from the ring 88 for each inlet chamber 85. The outlet chambers 86 for all of the gears except the one designated by the numeral 79, are connected with the outlet ring 90 by means of radially inwardly extended connections 91. The inlet and outlet rings 88 and 90 are in turn connected by pipes 92 and 93, respectively, with the oil supply or reservoir 94.

As seen in Figure 5, the outlet connection 93 is provided with a valve 95 having an actuating lever 96 coupled by means of cable 97 with the rotor brake control lever 71. When valve 96 is open, therefore, fluid is free to be circulated around the several units of the gear pump incorporating gears 75 to 78 inclusive. When valve 96 is in closed or partially closed position, the restriction of the outlet passage from the gear units imposes drag on the rotor through intermeshing of the gears 75 to 78 with the ring gear 74, this ring gear being mounted to rotate with the rotor.

The outlet from gear unit 79 is separately controlled by means of valve 98. This valve is coupled with the outlet chamber 86 for gear 79 by means of connection 99. The valve further has a pipe 100 extended for connection to the main inlet pipe 92. A third connection 101 extends from valve 98 to a central chamber 102 mounted at the bottom of the rotor head and communicating with the passage 51 formed in the rotor spindle 29 and further communicating with pipe 103 which extends downwardly to the hydraulic brake 64 for the landing wheel 63.

The control valve 98 incorporates a valve member proper 104 having ports therein arranged in T-shape, which ports, in the position of the valve illustrated in Figure 6, interconnect pipes 99, 100 and 101. In its other position, the portage in valve member 104 interconnects pipes 99 and 101, but the valve in this second position blocks flow to pipe 100. The position of the valve is controlled by an actuating arm 105 coupled by means of cable 106 with two cables 107 and 108, the former of which is extended for connection with cable 97 so as to be actuable in common therewith when the brake control lever 71 is moved. The other cable 108 extends over suitable pulleys or the like for connection with arm 58 of a bell crank mounted on shaft 59, the other arm 60 of this bell crank, as described hereinbefore, being coupled by a cable 62 with the rotor clutch control lever 61. As in the form first described, the shaft 59 constitutes the actuating means for the rotor drive clutch 18.

The wheel brake fluid supply pipe 103 is again equipped with a valve 65 having an actuating lever 66 and by-passed by means of pipe 69 with a check valve 70 therein.

From the foregoing description it will be seen that one of the gear pump units (the one incorporating gear 79) is separately controllable, and further that the fluid from this particular unit may be delivered to the blade pitch control device 15 and also to the landing wheel brake 64.

The operation of the arrangement of Figures 5, 6 and 7 is substantially as follows, it being again assumed that the craft is on the ground and preparations are being made to effect take-off. For this purpose, the rotor clutch control is moved to the "on" position, causing engagement of the rotor drive clutch 18 and further opening the wheel brake valve 65 and through cables 108 and 106 moving the valve member 104 so as to close by-pass connection 100 but maintain communication between pipes 99 and 101. As the rotor starts to turn, the ring gear 74 drives the pump gear 79 and this results in the delivery of pressure from this gear unit to the central chamber 102 at the bottom of the hub, from which the pressure is delivered upwardly through passage 51 and flexible tube 16 to the fluid pressure device 15 for moving the blade pitch from a higher to a lower value. Simultaneously, pressure is delivered through pipe 103 to the wheel brake 64 and thus during driving of the rotor on the ground the machine is held stationary until it is desired to take off.

To effect the take-off, the rotor clutch control 61 is moved from "on" to "off" position, and this results in return movements of valves 65 and 98 i. e., movement to the positions shown in Figures 5 and 6. With regard to these return movements, it will be understood, of course, that suitable return springs will be provided for the several valves in a manner similar to that described above in connection with the first form. With the valve 98 now returned to the position indicated in Figure 6, the oil is permitted to freely circulate from the outlet to the inlet side of gear pump unit 79 through connections 99, 100, 92, 88 and 89. At the same time the pressure built up in the pitch control device 15 and the associated passages is reduced by virtue of the interconnection of these passages with pipe 100 and the inlet pipe 92. Stated in another way, with the valve in the position shown in Figure 6, the entire fluid pressure system associated with gear unit 79 is at low pressure.

The result of this, as before, is movement of the blade pitch from a low value to a higher value under the influence of centrifugal force acting on the blade or blades, and further bleed-off of pressure in the wheel brake 64 through the by-pass 69. The machine may then take off as a result of the kinetic energy stored in the rotor, or if desired by effecting a run on the ground through the medium of the propulsion means.

In making a landing, just after the machine has settled, the rotor brake lever 71 is moved from "off" to "on" position and this moves both of valves 95 and 98, movement of valve 95 being in a sense to restrict or close the outlet pipe 93, so as to impose rotational drag on the rotor hub through the several gear units 75, 76, 77 and 78. Movement of valve 98 effects delivery of pressure to the blade pitch mechanism so as to again reduce the blade pitch and thus avoid undesired re-take-off after a landing has been made. It will be noted that actuation of valve 98 resulting from movement of the drag control lever 71 does not in any way affect the rotor drive clutch or the wheel brake valve 65. Use of the gear unit 79 to deliver pressure to the blade pitch mechanism also aids in slowing down the rotor, since the development of this pressure necessarily imposes a drag on the rotor.

Thus in this form of mechanism the entire braking effort for slowing down the rotor is derived from hydraulic means, the several gear pump units not only being effectively utilized jointly for this purpose, but one of them 79 further being utilized separately to accomplish other functions.

From the foregoing it will be seen that both forms of the mechanism described have certain advantages in common, notably the utilization of a pressure pump mechanism for several purposes, such as control of blade pitch, imposition of a drag on the rotor, and actuation of a wheel brake. Both forms of mechanism have the further advantage of location of the pressure pump in or closely associated with the rotor hub itself, so as to bring the source of pressure close to one of the most important points of use, i. e., the blade pitch control devices. It is of advantage also to locate the pressure pump in or at the rotor hub and to drive the pump by means of the rotor hub for the reason that with a rotor starter or drive mechanism a convenient source of driving power is already available to actuate the pump.

I claim:

1. In an aircraft having a sustaining rotor with a blade mounted for pitch variation; disconnectible drive means for the rotor, and mechanism for changing the blade pitch including a device for developing fluid pressure closely associated with the hub of the rotor and actuated by the driving means for the rotor.

2. In an aircraft having a sustaining rotor with a blade mounted for pitch variation, disconnectible drive means for the rotor, mechanism for changing the blade pitch including a device for developing fluid pressure closely associated with the hub of the rotor and actuated by the driving means for the rotor, and means interrelating the operation of the disconnectible drive and of said device.

3. In an aircraft having a sustaining rotor and an associated disconnectible driving mechanism therefor extending upwardly from the body of the craft to the hub of the rotor, fluid pressure operable means for varying the pitch of a blade of the rotor, and a fluid pump driven by the rotor drive means at the rotor hub to provide pressure for actuating said fluid pressure operable means.

4. In an aircraft having a sustaining rotor and an associated disconnectible driving mechanism therefor extending upwardly from the body of the craft to the hub of the rotor, fluid pressure operable means for varying the pitch of a blade of the rotor, a fluid pump driven by the rotor drive means at the rotor hub to provide pressure for actuating said fluid pressure operable means, and control means interconnecting the pump and the fluid pressure operable means upon connection of the drive to the rotor.

5. In an aircraft having a sustaining rotor and an associated disconnectible driving mechanism therefor extending upwardly from the body of the craft to the hub of the rotor, fluid pressure operable means for varying the pitch of a blade of the rotor, a fluid pump driven by the rotor drive means at the rotor hub to provide pressure for actuating said fluid pressure operable means, a fluid operable wheel brake for the craft, and controllable means for delivering fluid from said pump to the wheel brake.

6. In an aircraft having a sustaining rotor and an associated disconnectible driving mechanism therefor extending upwardly from the body of the craft to the hub of the rotor, fluid pressure operable means for varying the pitch of a blade of the rotor, a fluid pump driven by the rotor drive means at the rotor hub to provide pressure for actuating said fluid pressure operable means, a fluid operable wheel brake for the craft, means for delivering fluid from said pump to the wheel brake, and control means for interconnecting the pump and the fluid pressure operable means and also interconnecting the pump and the wheel brake upon connection of the drive to the rotor.

7. In an aircraft having a sustaining rotor and an associated disconnectible driving mechanism therefor extending upwardly from the body of the craft to the hub of the rotor, fluid pressure operable means for varying the pitch of a blade of the rotor, a fluid pump driven by the rotor drive means at the rotor hub to provide pressure for actuating said fluid pressure operable means, a fluid operable wheel brake for the craft, means for delivering fluid from said pump to the wheel brake, and control means for interconnecting the pump and the fluid pressure operable means and also interconnecting the pump and the wheel brake upon connection of the drive to the rotor, the control means providing for decrease of rotor blade pitch upon connection of the drive.

8. In an aircraft having a sustaining rotor with a blade mounted for pitch variation, disconnectible drive means for the rotor, mechanism for changing the blade pitch including a device for developing fluid pressure closely associated with the hub of the rotor and actuated by the driving means for the rotor, and means interrelating the operation of the disconnectible drive and of said device in a sense providing for decrease of blade pitch upon connection of the drive.

9. In an aircraft having a sustaining rotor, a hub for the rotor, a blade mounted on the hub with freedom for pitch change movement, rotor drive mechanism extended upwardly from the body of the craft to the rotor hub, a clutch in the drive mechanism, a fluid pressure actuable device for moving the blade from a higher to a lower pitch position, a fluid pump connected with and driven by the rotor hub, means for delivering fluid pressure from the pump to the blade pitch device, and a control associated with the clutch and said last means to provide for decrease of blade pitch upon driving the rotor.

10. In an aircraft having a sustaining rotor, a hub for the rotor, a blade mounted on the hub with freedom for pitch change movement, a brake for the rotor, a fluid pressure actuable device for moving the blade from a higher to a lower pitch position, a fluid pump connected with and driven by the rotor hub, means for delivering fluid pressure from the pump to the blade pitch device, and a control associated with the brake and said last means to provide for decrease of blade pitch upon application of braking torque to the rotor.

11. In an aircraft having a sustaining rotor, disconnectible drive mechanism for the rotor, a brake for the rotor, a fluid pressure operable pitch change device for the rotor including a fluid pump associated with and driven by the rotor hub, and common control means for the rotor drive, the rotor brake and the pitch change device providing for decrease of blade pitch upon application of the rotor drive or application of the brake.

12. In an aircraft having a sustaining rotor, disconnectible drive mechanism for the rotor, a brake for the rotor, a fluid pressure operable pitch change device for the rotor including a fluid pump associated with and driven by the rotor hub, a wheel brake for the craft, and control mechanism for the rotor drive, rotor brake, pitch change device and wheel brake providing for decrease of blade pitch and application of the wheel brake when the drive mechanism is connected, and further providing for decrease of blade pitch when the rotor brake is applied.

13. In an aircraft having a sustaining rotor, a fluid pressure actuated control device, a pump for developing fluid pressure for actuation of said device, said pump being connected with and driven by the rotor hub, means providing a low pressure circuit from the outlet to the inlet of said pump to provide for relatively free actuation thereof by rotation of the rotor, and means for at least in part closing said circuit, whereby to impose drag on the rotor hub for braking purposes.

14. In an aircraft having a sustaining rotor, a brake for the rotor comprising a fluid pressure pump having an inlet and an outlet, and means for restricting the outlet to impose a drag on the rotor hub for braking purposes.

15. In an aircraft having a sustaining rotor, a fluid pressure operable device for reducing rotor blade pitch, a fluid pressure pump associated with and actuated by the rotor hub, a connection between said pump and said device, a low pressure circuit connecting the inlet and outlet of the pump, and controllable valve means for delivering fluid from the pump through said connection to said device and for restricting said circuit to provide for the imposition of a drag on the rotor hub simultaneously with decrease of blade pitch angle.

16. In an aircraft sustaining rotor having a hub, a brake mechanism for the rotor including an internal gear arranged concentrically with the hub axis and rotatable with the hub, a plurality of cooperating gears, means associated with the gears and providing inlet and outlet fluid chambers at opposite sides of each of said second gears, a low pressure circuit between the inlet and outlet chambers, and controllable means for restricting the fluid outlet to impose rotational drag on the rotor.

17. In an aircraft sustaining rotor having a hub, a brake mechanism for the rotor including an internal gear arranged concentrically with the hub axis and rotatable with the hub, a plurality of cooperating gears, means associated with the gears and providing inlet and outlet fluid chambers at opposite sides of each of said second gears, a low pressure circuit between the inlet and outlet chambers, controllable means for restricting the fluid outlet to impose rotational drag on the rotor, a fluid pressure operable device for controlling rotor blade pitch angle, and means for delivering fluid under pressure from at least one of the outlet chambers to said device.

18. In an aircraft sustaining rotor having a hub, a brake mechanism for the rotor including an internal gear arranged concentrically with the hub axis and rotatable with the hub, a plurality of cooperating gears, means associated with the gears and providing inlet and outlet fluid chambers at opposite sides of each of said second gears, a low pressure circuit between the inlet and outlet chambers, controllable means for restricting the fluid outlet to impose rotational drag on the rotor, a fluid pressure operable device for decreasing rotor blade pitch angle, and means for delivering fluid under pressure from at least one of the outlet chambers to said device.

19. In an aircraft having a sustaining rotor, a fluid pressure operable device for changing the pitch angle of a rotor blade, a plurality of relatively rotatable fluid pressure gear pump elements connected with the rotor for actuation thereby, inlet and outlet chambers associated with the several elements, means for delivering fluid under pressure from the outlet for one of said elements to the blade pitch change device, means providing a low pressure circuit interconnecting the outlet and inlet chambers for the remainder of said elements, and controllable means for restricting the outlet from said remainder of the elements.

20. In an aircraft having a sustaining rotor, a fluid pressure operable device for changing the pitch angle of a rotor blade, a plurality of relatively rotatable fluid pressure gear pump elements connected with the rotor for actuation thereby, inlet and outlet chambers associated with the several elements, means for delivering fluid under pressure from the outlet for one of said elements to the blade pitch change device, means providing a low pressure circuit interconnecting the outlet and inlet chambers for the remainder of said elements, means providing a low pressure circuit interconnecting the outlet and inlet chambers of said one element, and controllable means for restricting the outlet from said remainder of the elements.

21. In an aircraft having a bladed sustaining rotor and an associated disconnectible driving mechanism therefor, means for varying the rotor blade pitch, a fluid pump closely associated with the rotor drive means to provide pressure for actuating said pitch changing means, a wheel brake for the craft, means utilizing fluid from said pump to actuate said brake, and control means for interconnecting the pump and the pitch changing means and also interconnecting the pump and the wheel brake upon connection of the drive to the rotor, the control means providing for decrease of rotor blade pitch upon connection of the drive.

AGNEW E. LARSEN.